(12) United States Patent
Berger et al.

(10) Patent No.: US 11,316,333 B2
(45) Date of Patent: Apr. 26, 2022

(54) SYSTEM FOR TRANSFERRING A MAGNETIC LINK

(71) Applicant: Conductix Wampfler France, Colombes (FR)

(72) Inventors: Jean-Michel Berger, Belley (FR); Lars Besser, Breisach Am Rhein (DE)

(73) Assignee: CONDUCTIX WAMPFLER FRANCE, Colombes (FR)

( * ) Notice: Subject to any disclaimer, the term of this patent is extended or adjusted under 35 U.S.C. 154(b) by 409 days.

(21) Appl. No.: 16/485,868

(22) PCT Filed: Feb. 15, 2018

(86) PCT No.: PCT/FR2018/050362
§ 371 (c)(1),
(2) Date: Aug. 14, 2019

(87) PCT Pub. No.: WO2018/150139
PCT Pub. Date: Aug. 23, 2018

(65) Prior Publication Data
US 2020/0059079 A1 Feb. 20, 2020

(30) Foreign Application Priority Data
Feb. 16, 2017 (FR) ...................................... 1751248

(51) Int. Cl.
*H02G 11/02* (2006.01)
*B65H 75/44* (2006.01)

(52) U.S. Cl.
CPC ............. *H02G 11/02* (2013.01); *B65H 75/44* (2013.01)

(58) Field of Classification Search
CPC ..... H02G 11/02; B65H 75/44; B65H 75/4449
See application file for complete search history.

(56) References Cited

U.S. PATENT DOCUMENTS 3,120,355 A * 2/1964 Bowman ............ B65H 75/4452
242/365.2
3,822,390 A * 7/1974 Janson ................... B65H 59/04
310/104
(Continued)

FOREIGN PATENT DOCUMENTS

CA  1232590 A  2/1988
FR  2643624 A1 8/1990
(Continued)

*Primary Examiner* — Sang K Kim
(74) *Attorney, Agent, or Firm* — Ryan T. Grace; Advent, LLP

(57) ABSTRACT

The invention relates to a system (1) for transferring a magnetic link (2) between a first element and a second element rotatable relative to the first element, a first end of said link being adapted to be attached to the first element and a second end of the link being adapted to be attached to the second element, characterised in that it comprises:
  a first part (11, 13) adapted to be rigidly connected to the first element;
  a second part (21, 23) rotatable relative to the first part and adapted to be rigidly connected to the second element so as to be rotationally driven at the rotational speed of said second element;
  a third part (30, 31) rotatable relative to the first and second parts,
  a member for coupling (40, 45) the second and third parts, adapted to rotationally drive the third part at a speed equal to half the rotational speed of the second element,
  two sets of two coaxial ferromagnetic surfaces for winding the magnetic link (2),
a first set comprising a first surface integral with the first part and a second surface integral with the third part,
a second set comprising a third surface integral with the second part and a fourth surface integral with the third part.

20 Claims, 6 Drawing Sheets

(56) References Cited

U.S. PATENT DOCUMENTS

| | | | |
|---|---|---|---|
| 3,822,834 A | | 7/1974 | Fjarlie |
| 4,565,333 A | * | 1/1986 | Meneian ................. H02G 11/02 |
| | | | 242/365.2 |
| 5,921,497 A | * | 7/1999 | Utley, Jr. ............. G02B 6/3604 |
| | | | 242/388.6 |
| 8,103,006 B2 | | 1/2012 | McGrath |
| 9,099,851 B2 | * | 8/2015 | Berg ...................... H02G 11/00 |

FOREIGN PATENT DOCUMENTS

| | | |
|---|---|---|
| FR | 2865860 A3 | 8/2005 |
| JP | H07277674 A | 10/1995 |
| JP | 2009544994 A | 12/2009 |
| JP | 4949477 B2 | 6/2012 |
| JP | 6051504 B2 | 12/2016 |
| WO | WO-2005083724 A1 | 9/2005 |
| WO | WO-2008012353 A1 | 1/2008 |

\* cited by examiner

SYSTEM FOR TRANSFERRING A MAGNETIC LINK

FIELD OF THE INVENTION

The present invention relates to a system for transferring a magnetic link between a first element and a second element rotatable relative to the first element, a first end of said link being adapted to be attached to the first element and a second end of the link being adapted to be attached to the second element.

PRIOR ART

Numerous industrial applications exist in which it is necessary to transmit energy and/or signals (for example, an electric current, optical signals, a mechanical stress, a fluid, etc.) by a rotating link between a first element and a second element movable relative to the first element. For example, the first element may be cabinet fixed to the ground, a frame of a robot, etc. and the second element may be a wagon or a gantry rolling on the ground, an arm of a robot, etc.

The aforementioned energy and/or signals are transmitted through an electric cable, an optic fibre or a bundle of optic fibres, a mechanical cable, a hydraulic or pneumatic conduit or any other appropriate means, generally designated in the present text by "energy and/or signals transfer element".

To avoid the energy transfer element being deployed in a disordered manner during the displacement of the second element relative to the first element, it is known to arrange the energy and/or signals transfer element on a drum mounted on the first or the second element, so as to unwind or wind said transfer element in a synchronised manner with the displacement of the second element.

In particular, the Applicant has designed a transfer system comprising two coaxial ferromagnetic surfaces, in which a magnetic link integral with the energy and/or signals transfer element is wound on each of the two surfaces and passes from one to the other in the course of a relative rotation of one surface relative to the other. Magnetic attraction maintains the magnetic link wound against said ferromagnetic surfaces or against a turn already in contact with said surfaces, in order to avoid any untimely unwinding of the link.

The document FR 2 865 860 thus describes a system for transferring a magnetic link between a first element and a second element rotatable relative to the first element, a first end of said link being adapted to be attached to the first element and a second end of the link being adapted to be attached to the second element, which comprises a body and an axle rotatable relative to the body, of which one is intended to be rigidly connected to the first element and the other to the second element, such that the rotation of the second element drives the relative rotation of the body and the axle at the rotational speed of the second element. The body and the axle each bear a ferromagnetic surface for winding the magnetic link, said surfaces being coaxial.

The documents WO 2005/08374 and WO 2008/012353 describe magnetic links adapted to such a transfer system. Generally speaking, these links comprise a magnetised strip having a permanent magnetisation oriented in the direction of the thickness of said strip, and at least one energy and/or signals transfer element extending along the magnetised strip and integral therewith.

However, a transfer system such as described above is generally adapted to receive up to 90 turns of the magnetic link.

Indeed, beyond such a number of turns, the magnetic attraction becomes insufficient to flatten correctly the turns of the magnetic link against the ferromagnetic surfaces.

The problem is thus posed of designing a transfer system that remains efficient for a high number of turns, typically greater than 90 turns.

The document FR 2 643 624 describes a system for transferring a link (non-magnetic), which is constituted of a fixed coil, integral with a fixed part of the rotating link, an accumulator coil integral with a moveable part of the rotating link, and two intermediate coils driven in rotation at half the speed of the accumulator coil by a conical pinion. The intermediate coils make it possible to double the number of turns of the rotating link, compared to a system constituted only of the fixed coil and the accumulator coil. However, a drawback of this system is that it has a complex structure comprising couplings, bearings, and a large number of parts subjected to mechanical wear. It is thus expensive to produce and to maintain. In addition, it is bulky, in particular in the axial direction.

DESCRIPTION OF THE INVENTION

An aim of the invention is thus to design a system for transferring a magnetic link between a first element and a second element rotatable relative to the first element, and which makes it possible to control the winding and the unwinding of the link even in the presence of a high number of turns of the magnetic link. Such a system further has to remain relatively compact compared to existing systems, and require a limited number of components.

To this end, the proposed invention is a system for transferring a magnetic link between a first element and a second element rotatable relative to the first element, a first end of said link being adapted to be attached to the first element and a second end of the link being adapted to be attached to the second element, characterised in that it comprises:

a first part adapted to be rigidly connected to the first element;

a second part rotatable relative to the first part and adapted to be rigidly connected to the second element so as to be rotationally driven at the rotational speed of said second element;

a third part rotatable relative to the first and second parts, a member for coupling the second and third parts, adapted to rotationally drive the third part at a speed equal to half the rotational speed of the second element, two sets of two coaxial ferromagnetic surfaces for winding the magnetic link, a first set comprising a first surface integral with the first part and a second surface integral with the third part, a second set comprising a third surface integral with the second part and a fourth surface integral with the third part.

According to an embodiment, the third part is an axle, the first part is a first body portion, the second part is a second body portion, said body portions extending around the axle.

Said coupling member may comprise a satellite comprising a first transmission means coupled to the second part and a second transmission means coupled to the third part.

According to another embodiment, the first part is a first axle portion, the second part is a second axle portion coaxial with the first part, and the third part is a body extending around the first and second axle portions.

Said coupling member may comprise a conical pinion coupled to the body and adapted to rotationally drive said body at a speed equal to half the rotational speed of the second element.

Alternatively, the coupling member may comprise a satellite comprising a first transmission means coupled to the second part and a second transmission means coupled to the first part.

The first and/or the second transmission means comprises a gearing, or a belt.

According to an embodiment of the invention, the system comprises two rotating joints assembled coaxially each comprising an axle, a body rotatable relative to the axle, and a set of two coaxial ferromagnetic surfaces for winding the magnetic link, one of said surfaces being integral with the axle and the other surface being integral with the body. The first part is respectively an axle or a body of a first rotating joint, the second part is respectively an axle or a body of a second rotating joint, the third part is formed of a rigid assembly respectively of the axles or the bodies of the two rotating joints.

In a particularly advantageous manner, the magnetic link is a flat ribbon.

According to a preferred embodiment, the magnetic link comprises:
  a magnetised strip having a permanent magnetisation oriented in the direction of the thickness of said strip;
  at least one energy and/or signals transfer element extending along the magnetised strip; and
  a coating material connected to the magnetised strip and enveloping each energy and/or data transfer element.

The link between the coating material and the magnetised strip may be ensured by an adhesive.

According to an embodiment, the energy and/or signals transfer element is an optic fibre.

According to an embodiment, the magnetised strip is subdivided into successive longitudinal sections.

In a particularly advantageous manner, each set of two magnetic surfaces is capable of receiving between 10 and 90 turns of the magnetic link.

DESCRIPTION OF THE FIGURES

Other characteristics and advantages will become clear from the detailed description that follows, with reference to the appended drawings in which.

DETAILED DESCRIPTION OF EMBODIMENTS OF THE INVENTION

The system for transferring a magnetic link according to the invention may take different forms of which three particular but non-limiting embodiments will be described hereafter.

In a manner known per se, the magnetic link has a first end adapted to be attached to the first element and a second end adapted to be attached to the second element.

The first and second elements may be any element that can be used in industry.

For example, the first element may be: a machine-tool frame, the structure of a crane, the civil engineering of a port facility, the frame of a gantry, a sealing cap, etc. The moveable element may be in particular: a coil, a robotised arm, a machine-tool slide, a reducer shaft, a rotating joint, the moveable part of an electrical collector, etc. These lists are obviously not limiting.

The magnetic link may in particular be a link such as described in the documents WO 2005/08374 and WO 2008/012353, to which reference may be made for a detailed description.

Preferably, the magnetic link is in the form of a flat ribbon, this form favouring a regular winding of the link on the ferromagnetic surfaces.

Figure 4A:
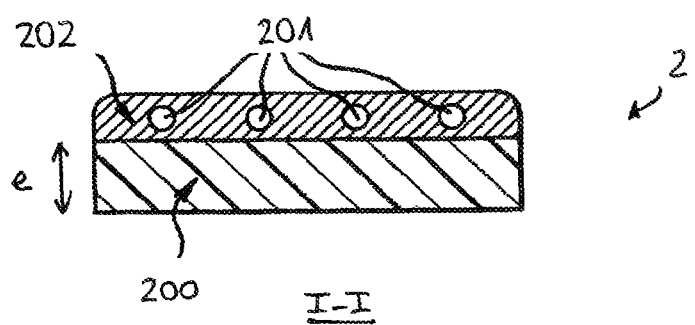
FIGS. 4A and 4B are transversal and longitudinal sectional views of a magnetic link capable of being used in a transfer system according to the invention.
Figure 4B:
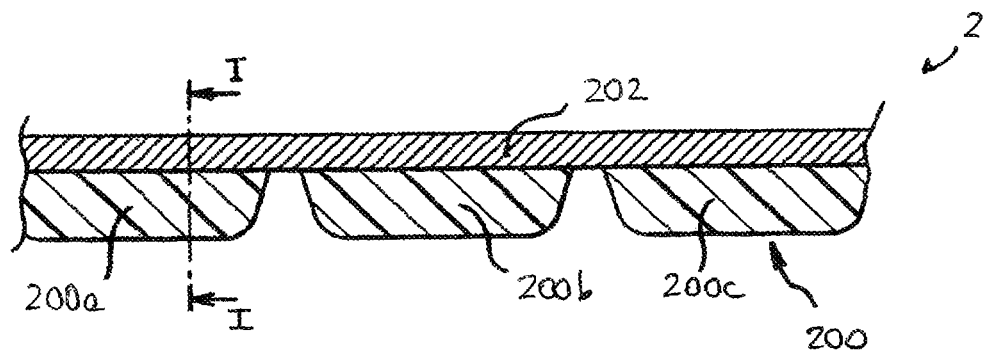

According to a preferred embodiment illustrated in FIGS. 4A and 4B, the magnetic link 2 comprises:
  a magnetised strip 200 having a permanent magnetisation oriented in the direction of the thickness (noted e) of said strip;
  at least one energy and/or signals transfer element 201 extending along the magnetised strip 200; and
  a coating material 202 connected to the magnetised strip 200 and enveloping each energy and/or data transfer element 201.

The magnetised strip may be constituted of an elastomeric material in which are embedded particles passing onto it a permanent magnetisation oriented in the direction of its thickness.

According to an embodiment, the link between the coating material 202 and the magnetised strip 200 is ensured by an adhesive (not represented). Said adhesive may for example be a glue, a double face adhesive film, etc.

According to a particular application of the invention, the energy and/or signals transfer element is an optic fibre.

In a particularly advantageous manner, as described in the document WO 2008/012353, the magnetised strip 200 is subdivided into successive longitudinal sections 200a, 200b, 200c. These different sections, of which the length is much less than the total length of the link, make it possible to avoid that, during dimensional changes due in particular to temperature variations, the shear forces generated between the magnetised strip and the coating material are sufficiently strong to cause a disbondment between these two elements. Indeed, the notches made in the magnetised strip to delimit the different sections make it possible to relax the shear stresses between the coating material and the magnetised strip.

Naturally, those skilled in the art will be able to design the link as a function of the targeted application and the constraints pertaining thereto, and to adapt the teaching of documents WO 2005/08374 and WO 2008/012353, without however going beyond the scope of the present invention.

Generally speaking, the system for transferring the link comprises:
  a first part adapted to be rigidly connected to the first element;
  a second part rotatable relative to the first part and adapted to be rigidly connected to the second element so as to be rotationally driven at the rotational speed of said second element;
  a third part rotatable relative to the first and second parts,
  a member for coupling the second and third parts, adapted to rotationally drive the third part at a speed equal to half the rotational speed of the second element, two sets of two coaxial ferromagnetic surfaces for winding the magnetic link,
a first set comprising a first surface integral with the first part and a second surface integral with the third part,
a second set comprising a third surface integral with the second part and a fourth surface integral with the third part.

According to an embodiment, the coupling member comprises a satellite comprising a first transmission means coupled to the second part and a second transmission means coupled to the third part. To this end, any transmission means may be employed, such as a belt, a chain, a gearing, etc.

According to another embodiment, in the case where the third part forms the body of the transfer system and the first and second parts form two coaxial axle portions, one being connected to the first element and the other to the second element, the coupling member comprises a conical pinion coupled to said body and adapted to rotationally drive said body at a speed equal to half the rotational speed of the second element.

The two ferromagnetic surfaces of each set are coaxial and facing each other in the radial direction. The two ferromagnetic surfaces integral with the third part, which belong respectively to the first set and to the second set of ferromagnetic surfaces, are coaxial but distant from one another in the axial direction.

Thus, during the displacement of the second element relative to the first element, the link is displaced between the coaxial ferromagnetic surfaces integral with the first part and the second part through ferromagnetic surfaces integral with the third part.

If the two sets of ferromagnetic surfaces have the same dimensions and thus accept the same number of turns, the system according to the invention thereby makes it possible to double the number turns of the link compared to a rotating joint comprising a single of said sets of magnetic surfaces.

Furthermore, as described in detail hereafter, the coupling of the different parts of the system is achieved by means of a small number of parts and is thereby more robust than the system described in the document FR 2 643 624.

It is to be noted that such a transfer system may be specifically designed and manufactured according to the preceding definition. This makes it possible in particular to optimise the design of the different components and the assembly thereof.

Alternatively, said link transfer system may be formed by assembling two known rotating joints, such as described in the document FR 2 865 860, each of these rotating joints comprising an axle, a body rotatable relative to the axle, and a set of two coaxial ferromagnetic surfaces for winding the magnetic link, one of said surfaces being integral with the axle and the other surface being integral with the body.

Said joints are then assembled coaxially, by rigidly connecting the axles of the two rotating joints (the body of one rotating joint being connected to the first element and the body of the other rotating joint being connected to the second element) and by driving said axles at half the rotational speed of the second element by means of a member for coupling said axles to the body connected to the second element. Said coupling member may be for example a satellite comprising a first transmission means coupled to the body connected to the second element and a second transmission means coupled to the set of two axles.

Alternatively, the bodies of the two rotating joints are rigidly connected (the axle of one rotating joint being connected to the first element and the axle of the other rotating joint being connected to the second element) and they are driven at half the speed of the axle of the rotating joint connected to the second element by means of a member for coupling said bodies to the axle connected to the second element. Said coupling member may be for example a conical pinion or a satellite comprising a first transmission means coupled to the axle connected to the second element and a second transmission means coupled to the set of two bodies.

Figure 1A:
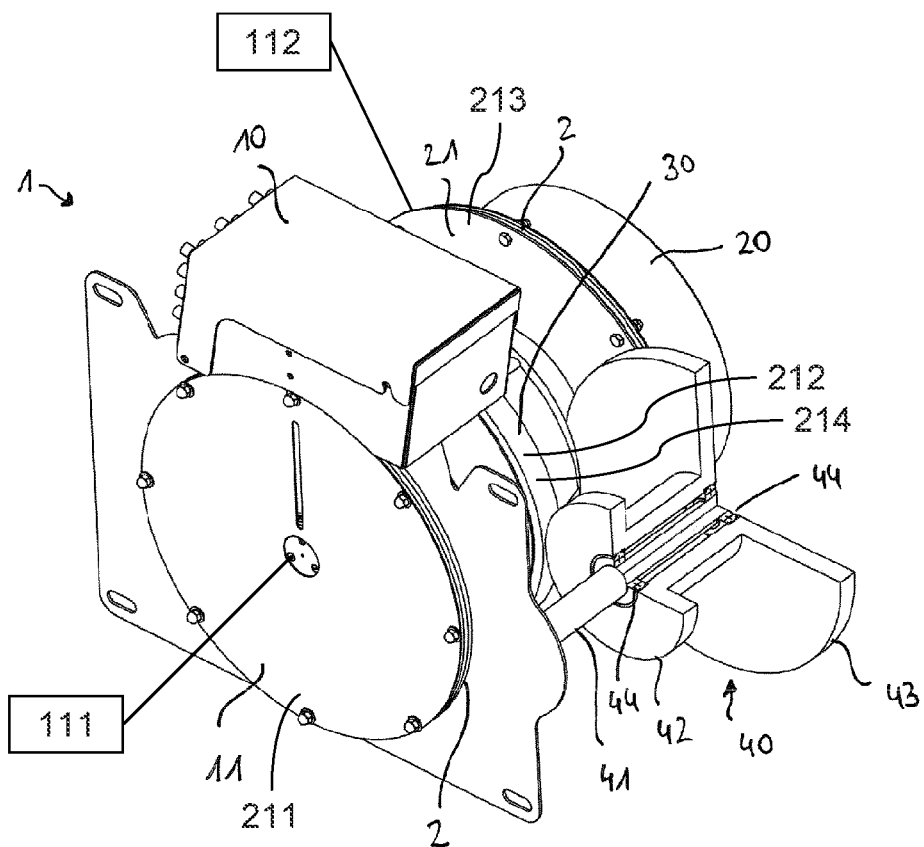
FIGS. 1A to 1C are views of a transfer system according to a first embodiment of the invention.
Figure 1B:
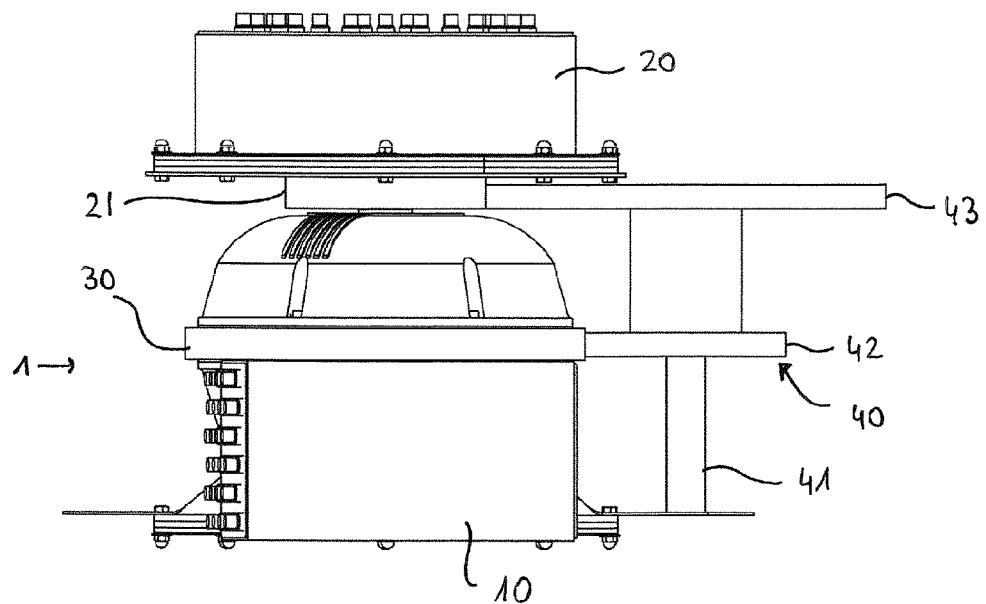
Figure 1C:
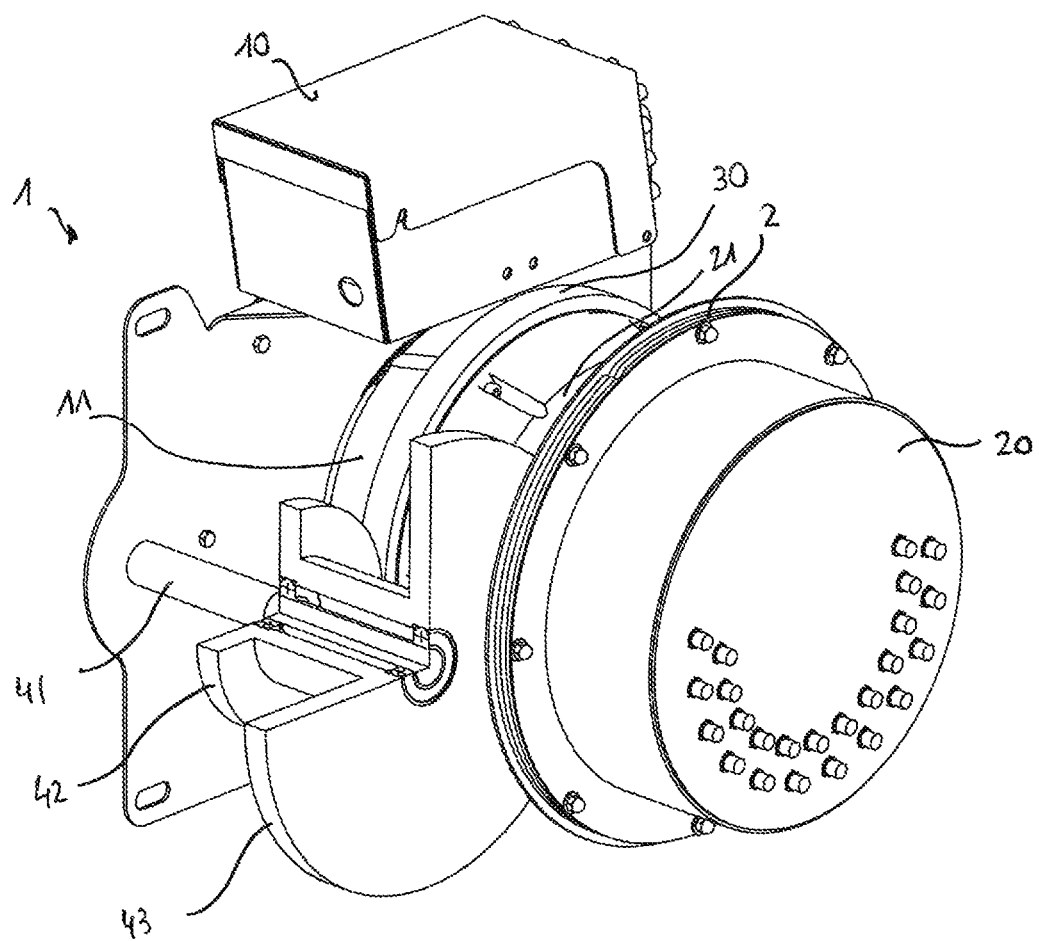

FIGS. 1A to 1C illustrate a first embodiment of the invention.

The system 1 for transferring the link 2 comprises two body portions 11, 21: the portion 11 is connected to the first element 111 whereas the portion 21 is connected to the second element 112. The link of the body portions to the first and second elements 111, 112 may be achieved by any appropriate means, in particular, as regards the first element 111: silentblocs, screws, rivets, welding, etc.; as regards the second element 112: a flexible coupling, a drive finger, a coupler, screws, silentblocs, etc.

If the first element 111 is fixed, the body portion 11 is thus fixed, whereas the body portion 21 is rotationally driven by the second element 112 at a speed V equal to that of the second element 112.

Each body portion 11, 21 supports a respective box 10, 20 for connecting the energy and/or data transfer element(s) borne by the magnetic link 2 respectively to the first element 111 and to the second element 112.

Inside the two body portions 11, 21 is arranged an axle 30 rotatable relative to said body portions and coaxial therewith. Only a part of the axle 30 is visible in FIGS. 1A to 1C, but the axle 30 extends substantially over the whole length of the transfer system 1.

A coupling member 40 being in the form of a satellite makes it possible to couple said axle 30 to the body portion 21.

The satellite 40 is mounted freely rotating through bearings 44 on an axle 41 integral with the first element 111.

Said satellite 40 comprises two pinions of which one (43) is arranged to mesh with the body portion 21 and the other (42) to mesh with the axle 30. The diameter of the two pinions 42, 43 is chosen so as to procure a reduction ratio of 2 between the body portion 21 and the axle 30. In other words, the coupling member 40 makes it possible to drive the axle 30 at a speed V/2 equal to half the speed V of the body portion 21.

The meshing mode is not limiting: it may be teeth (gearing), but also belts, chains, etc.

The system 1 comprises two sets of ferromagnetic surfaces (not visible in FIGS. 1A to 1C) on which is wound the magnetic link 2:
a first set of two coaxial surfaces 211, 212 and facing each other in the radial direction comprises an outer surface 211 integral with the body portion 11 connected to the first element 111, and an inner surface 212 integral with the axle 30;
a second set of two coaxial surfaces 213, 214 and facing each other in the radial direction comprises an outer surface 213 integral with the body portion 21 connected to the second element 112, and an inner surface 214 integral with the axle 30.

During the operation of the transfer system, the path of the magnetic link thus comprises successively the outer surface 211 of the first set 211, 212, the inner surface 212 of the first set 211, 212, the inner surface 214 of the second set 213, 214, the outer surface 214 of the second set 213, 214 (and vice versa in the case of a rotation in the opposite direction).

Alternatively, the system may comprise two magnetic links, each associated with a set of coaxial surfaces, the two links being connected at the level of the axle 30.

Figure 2A:
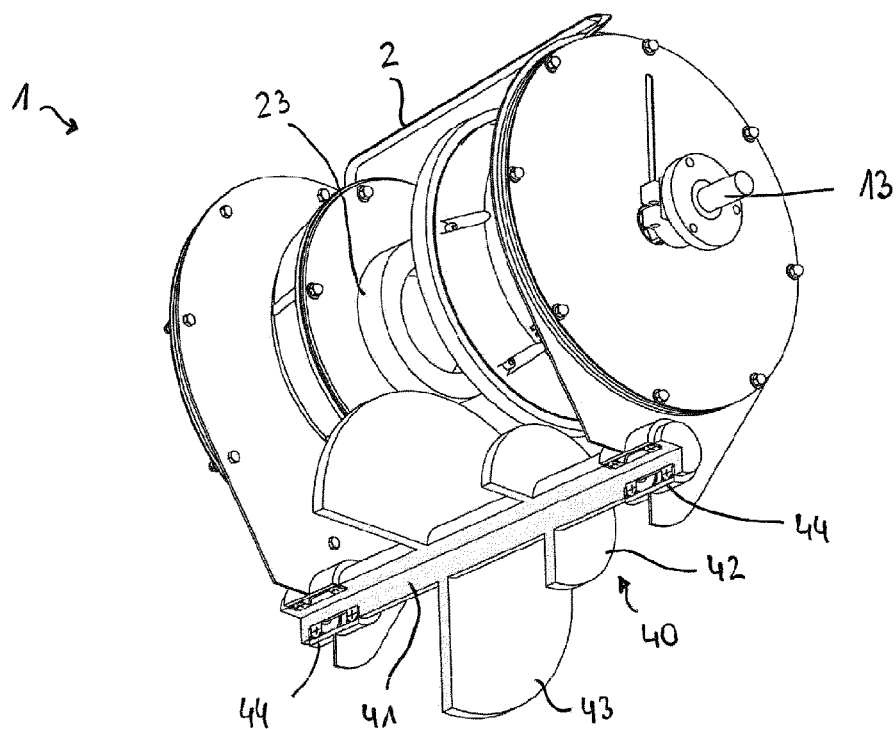
FIGS. 2A and 2B are views of a transfer system according to a second embodiment of the invention.
Figure 2B:
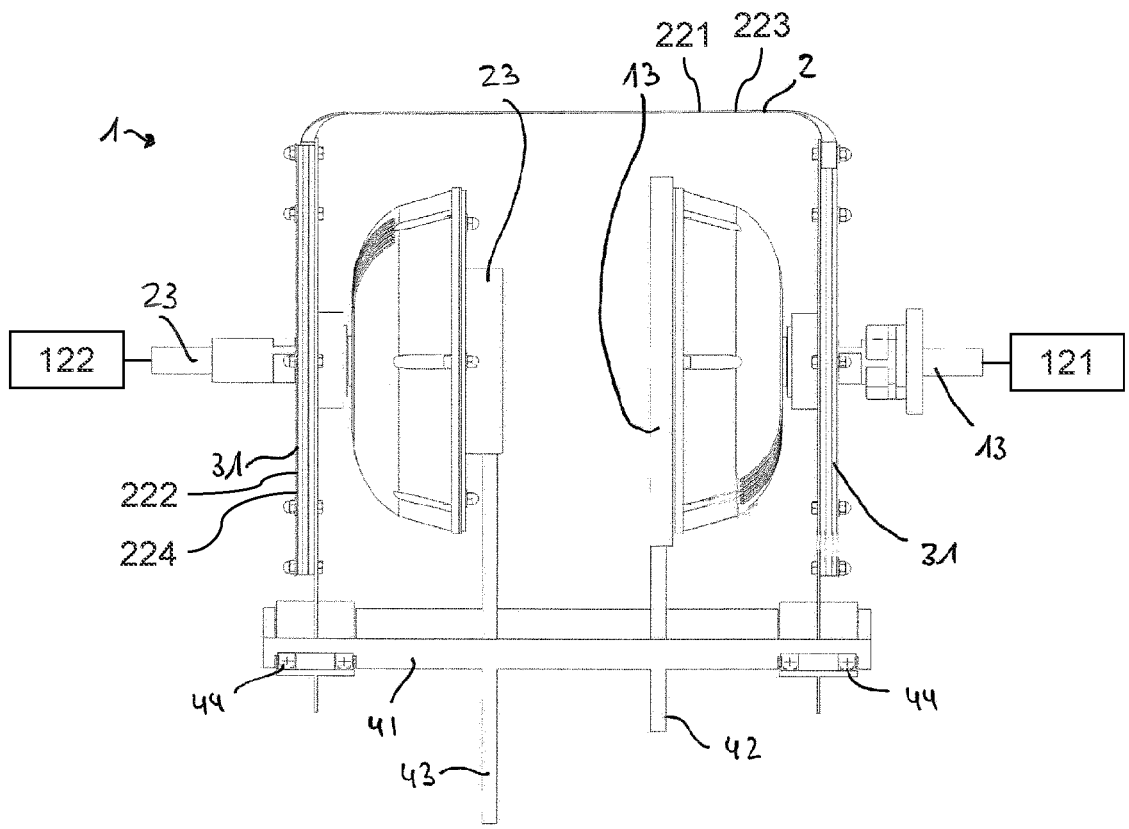

FIGS. 2A and 2B illustrate a second embodiment of the invention.

The system 1 for transferring the link 2 comprises two coaxial axle portions 13, 23: the portion 13 is connected to the first element 121 whereas the portion 23 is connected to the second element 122. The link of the axle portions to the first and second elements 121, 122 may be achieved by any appropriate means, in particular, as regards the first element 121: silentblocs, screws, rivets, welding, etc.; as regards the second element 122: a flexible coupling, a drive finger, a coupler, screws, silentblocs, etc.

If the first element 121 is fixed, the axle portion 13 is thus fixed, whereas the axle portion 23 is rotationally driven by the second element 122 at a speed V equal to that of the second element 122.

The two axle portions 13, 23 are arranged in a body 31 coaxial therewith and rotatable relative to said axle portions.

A coupling member 40 being in the form of a satellite makes it possible to couple said body 31 to the axle portions 13, 23.

The satellite 40 comprises an axle 41 mounted freely rotating through bearings 44 on the body 31. In the embodiment illustrated in FIG. 2B, the body 31 is constituted of two parts rigidly connected by the axle 41.

Said satellite 40 comprises two pinions extending from the axle 41, of which one (pinion 43) is arranged to mesh with the axle portion 23 and the other (pinion 42) to mesh with the axle portion 13. The diameter of the two pinions 42, 43 is chosen so as to procure a reduction ratio of 2 between the axle portion 23 and the body 31. In other words, the coupling member 40 makes it possible to drive the body 31 at a speed V/2 equal to half the speed V of the axle portion 23.

The meshing mode is not limiting: it may be teeth (gearing), but also belts, chains, etc.

The system 1 further comprises two sets of ferromagnetic surfaces (not visible in FIGS. 2A and 2B) on which is wound the magnetic link 2:
- a first set of two coaxial surfaces 221, 222 and facing each other in the radial direction comprises an outer surface 221 integral with the axle portion 13 connected to the first element 121, and an inner surface 222 integral with the body 31;
- a second set of two coaxial surfaces 223, 224 and facing each other in the radial direction comprises an outer surface 223 integral with the axle portion 13 connected to the second element 122, and an inner surface 224 integral with the body 31.

During the operation of the transfer system, the path of the magnetic link thus comprises successively the inner surface 222 of the first set 221, 222, the outer surface 221 of the first set 221, 222, the outer surface 223 of the second set 223, 224, the inner surface 224 of the second set 223, 224 (and vice versa in the case of a rotation in the opposite direction).

Alternatively, the system may comprise two magnetic links, each associated with a set of coaxial surfaces, the two links being connected at the level of the body 31.

Figure 3A:
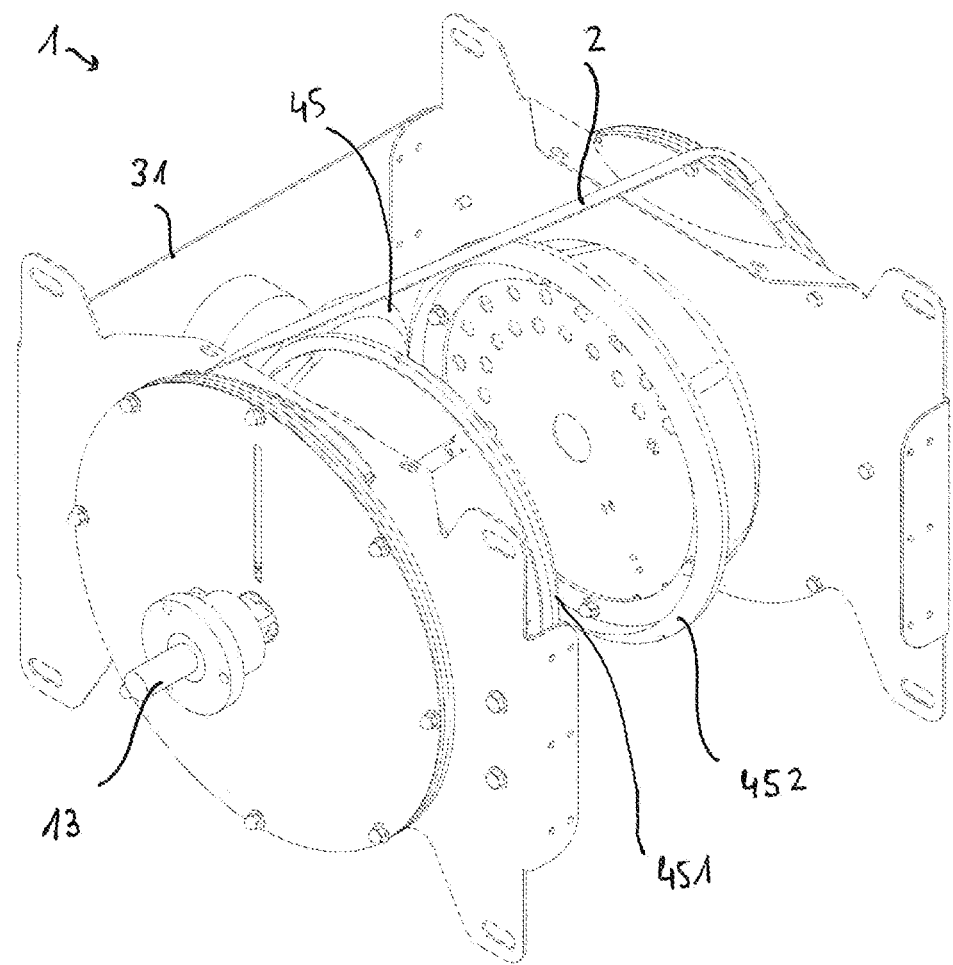
FIGS. 3A to 3C are views of a transfer system according to a third embodiment of the invention.
Figure 3B:
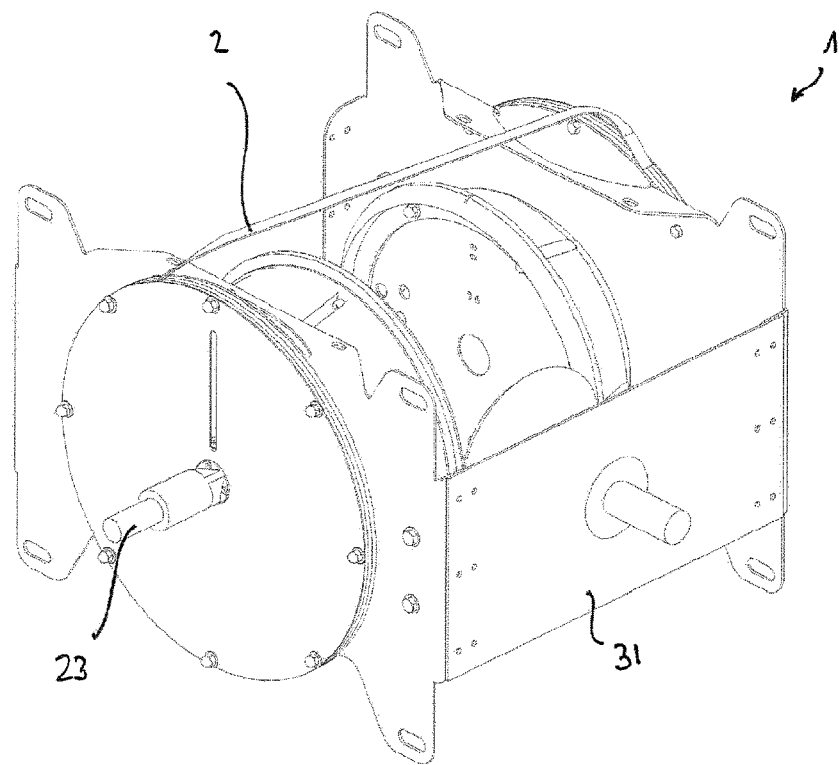
Figure 3C:
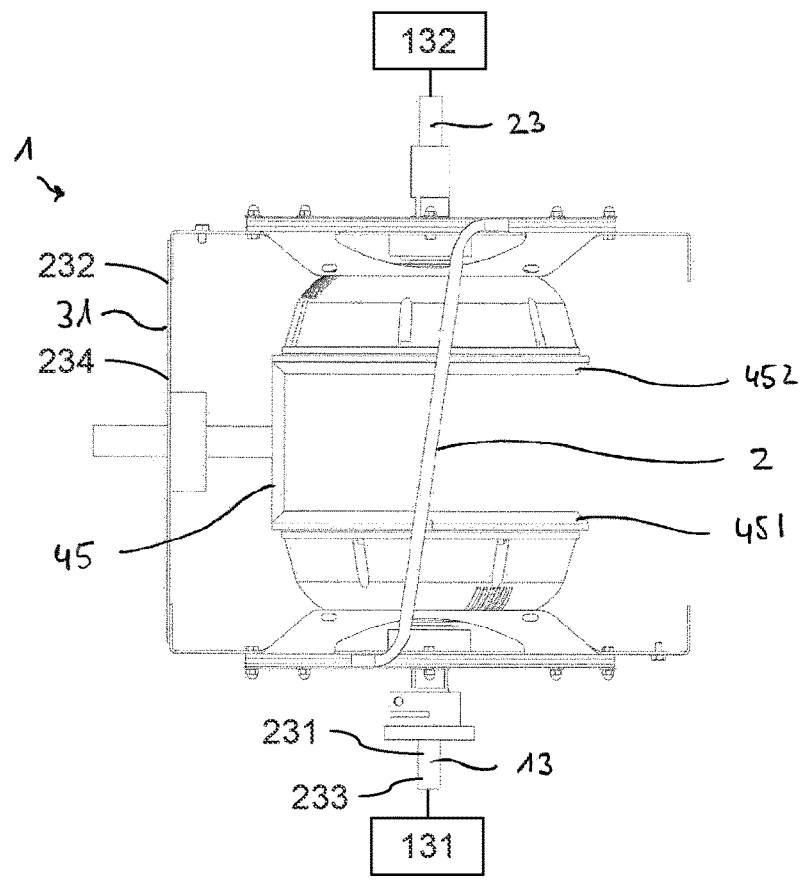

FIGS. 3A to 3C illustrate a third embodiment of the invention.

As in the embodiment of FIGS. 2A and 2B, the system 1 for transferring the link 2 comprises two coaxial axle portions 13, 23: the portion 13 is connected to the first element 131 whereas the portion 23 is connected to the second element 132. The link of the axle portions to the first and second elements 131, 132 may be achieved by any appropriate means, in particular, as regards the first element 131: silentblocs, screws, rivets, welding, etc.; as regards the second element 132: a flexible coupling, a drive finger, a coupler, screws, silentblocs, etc.

If the first element 131 is fixed, the axle portion 13 is thus fixed, whereas the axle portion 23 is rotationally driven by the second element 132 at a speed V equal to that of the second element 132.

The two axle portions 13, 23 are arranged in a body 31 coaxial therewith and rotatable relative to said axle portions.

A conical pinion 45 is rotationally mounted on the body 31 and meshes with two conical wheels 451 and 452 integral respectively with the axle portions 13 and 23.

Said pinion 45 is dimensioned so as to procure a reduction ratio of 2 between the axle portion 23 and the body 31. In other words, the pinion 45 makes it possible to drive in rotation the body 31 at a speed V/2 equal to half the speed V of the axle portion 23.

The system 1 further comprises two sets of ferromagnetic surfaces (not visible in FIGS. 3A to 3C) on which is wound the magnetic link 2:
- a first set of two coaxial surfaces 231, 232 and facing each other in the radial direction comprises an inner surface 231 integral with the axle portion 13 connected to the first element 131, and an outer surface 232 integral with the body 31;
- a second set of two coaxial surfaces 233, 234 and facing each other in the radial direction comprises an inner surface 233 integral with the axle portion 13 connected to the second element 132, and an outer surface 234 integral with the body 31.

During the operation of the transfer system, the path of the magnetic link thus comprises successively the inner surface 231 of the first set 231, 232, the outer surface 232 of the first set 231, 232, the outer surface 234 of the second set 233, 234, the inner surface 233 of the second set 233, 234 (and vice versa in the case of a rotation in the opposite direction).

Alternatively, the system may comprise two magnetic links, each associated with a set of coaxial surfaces, the two links being connected at the level of the body 31.

REFERENCES

FR 2 865 860
WO 2005/083724
WO 2008/012353
FR 2 643 624

The invention claimed is:

1. A system for transferring a magnetic link between a first element and a second element rotatable relative to the first element, a first end of said link being adapted to be attached to the first element and a second end of the link being adapted to be attached to the second element, wherein the first element is a machine-tool frame, a structure of a crane, a civil engineering of a port facility, a frame of a gantry, or a sealing cap, wherein the second element is a coil, a robotised arm, a machine-tool slide, a reducer shaft, a rotating joint, a moveable part of an electrical collector, said system comprising:
   a first part adapted to be rigidly connected to the first element;
   a second part rotatable relative to the first part and adapted to be rigidly connected to the second element so as to be rotationally driven at the rotational speed of said second element;
   a third part rotatable relative to the first and second parts;

a member for coupling the second and third parts, adapted to rotationally drive the third part at a speed equal to half the rotational speed of the second element;

two sets of two coaxial ferromagnetic surfaces for winding the magnetic link including
 a first set comprising a first surface integral with the first part and a second surface integral with the third part, and
 a second set comprising a third surface integral with the second part and a fourth surface integral with the third part, wherein the first surface and the second surface are coaxial and facing each other in a radial direction, the third surface and the fourth surface are coaxial and facing each other in the radial direction, and the second surface and the fourth surface are coaxial but distant from one another in an axial direction, wherein the third part is an axle, the first part is a first body portion, the second part is a second body portion, said body portions extending around the axle, wherein the coupling member comprises a satellite comprising a first transmission means coupled to the second part and a second transmission means coupled to the third part.

2. The system of claim 1, wherein the first and second transmission means comprises a gearing.

3. The system of claim 1, wherein the first and second transmission means comprises a belt.

4. The system of claim 1, comprising two rotating joints assembled coaxially each comprising an axle, a body rotatable relative to the axle, and a set of two coaxial ferromagnetic surfaces for winding the magnetic link, one of said surfaces being integral with the axle and the other surface being integral with the body, wherein the first part is respectively an axle or a body of a first rotating joint, the second part is respectively an axle or a body of a second rotating joint, the third part is formed of a rigid assembly respectively of the axles or the bodies of the two rotating joints.

5. The system of claim 1, wherein the magnetic link is a flat ribbon.

6. The system of claim 1, wherein the magnetic link comprises:
 a magnetised strip having a permanent magnetisation oriented in the direction of the thickness of said strip;
 at least one energy or signals transfer element extending along the magnetised strip; and
 a coating material connected to the magnetised strip and enveloping each energy or data transfer element.

7. The system of claim 6, wherein the link between the coating material and the magnetised strip is ensured by an adhesive.

8. The system of claim 6, wherein the energy and/or or signals transfer element is an optic fibre.

9. The system of claim 6, wherein the magnetised strip is subdivided into successive longitudinal sections.

10. The system of claim 1, wherein each set of two magnetic surfaces is capable of receiving between 10 and 90 turns of the magnetic link.

11. A system for transferring a magnetic link between a first element and a second element rotatable relative to the first element, a first end of said link being adapted to be attached to the first element and a second end of the link being adapted to be attached to the second element, wherein the first element is a machine-tool frame, a structure of a crane, a civil engineering of a port facility, a frame of a gantry, or a sealing cap, wherein the second element is a coil, a robotised arm, a machine-tool slide, a reducer shaft, a rotating joint, a moveable part of an electrical collector, said system comprising:
 a first part adapted to be rigidly connected to the first element;
 a second part rotatable relative to the first part and adapted to be rigidly connected to the second element so as to be rotationally driven at the rotational speed of said second element;
 a third part rotatable relative to the first and second parts;
 a member for coupling the second and third parts, adapted to rotationally drive the third part at a speed equal to half the rotational speed of the second element; and
 two sets of two coaxial ferromagnetic surfaces for winding the magnetic link including
  a first set comprising a first surface integral with the first part and a second surface integral with the third part, and
  a second set comprising a third surface integral with the second part and a fourth surface integral with the third part,
 wherein the first surface and the second surface are coaxial and facing each other in a radial direction, the third surface and the fourth surface are coaxial and facing each other in the radial direction, and the second surface and the fourth surface are coaxial but distant from one another in an axial direction,
 wherein the first part is a first axle portion, the second part is a second axle portion coaxial with the first part, and the third part is a body extending around the first and second axle portions,
 wherein the coupling member comprises a conical pinion coupled to the body and adapted to rotationally drive said body at a speed equal to half the rotational speed of the second element.

12. The system of claim 11, comprising two rotating joints assembled coaxially each comprising an axle, a body rotatable relative to the axle, and a set of two coaxial ferromagnetic surfaces for winding the magnetic link, one of said surfaces being integral with the axle and the other surface being integral with the body, wherein the first part is respectively an axle or a body of a first rotating joint, the second part is respectively an axle or a body of a second rotating joint, the third part is formed of a rigid assembly respectively of the axles or the bodies of the two rotating joints.

13. The system of claim 11, wherein the magnetic link is a flat ribbon.

14. The system of claim 11, wherein each set of two magnetic surfaces is capable of receiving between 10 and 90 turns of the magnetic link.

15. A system for transferring a magnetic link between a first element and a second element rotatable relative to the first element, a first end of said link being adapted to be attached to the first element and a second end of the link being adapted to be attached to the second element, wherein the first element is a machine-tool frame, a structure of a crane, a civil engineering of a port facility, a frame of a gantry, or a sealing cap, wherein the second element is a coil, a robotised arm, a machine-tool slide, a reducer shaft, a rotating joint, a moveable part of an electrical collector, said system comprising:
 a first part adapted to be rigidly connected to the first element;

a second part rotatable relative to the first part and adapted to be rigidly connected to the second element so as to be rotationally driven at the rotational speed of said second element;

a third part rotatable relative to the first and second parts;

a member for coupling the second and third parts, adapted to rotationally drive the third part at a speed equal to half the rotational speed of the second element; and two sets of two coaxial ferromagnetic surfaces for winding the magnetic link including
- a first set comprising a first surface integral with the first part and a second surface integral with the third part, and
- a second set comprising a third surface integral with the second part and a fourth surface integral with the third part, wherein the first surface and the second surface are coaxial and facing each other in a radial direction, the third surface and the fourth surface are coaxial and facing each other in the radial direction, and the second surface and the fourth surface are coaxial but distant from one another in an axial direction, wherein the first part is a first axle portion, the second part is a second axle portion coaxial with the first part, and the third part is a body extending around the first and second axle portions, wherein the coupling member comprises a satellite comprising a first transmission means coupled to the second part and a second transmission means coupled to the first part.

16. The system of claim 15, wherein the first and second transmission means comprises a gearing.

17. The system of claim 15, wherein the first and second transmission means comprises a belt.

18. The system of claim 15, comprising two rotating joints assembled coaxially each comprising an axle, a body rotatable relative to the axle, and a set of two coaxial ferromagnetic surfaces for winding the magnetic link, one of said surfaces being integral with the axle and the other surface being integral with the body, wherein the first part is respectively an axle or a body of a first rotating joint, the second part is respectively an axle or a body of a second rotating joint, the third part is formed of a rigid assembly respectively of the axles or the bodies of the two rotating joints.

19. The system of claim 15, wherein the magnetic link is a flat ribbon.

20. The system of claim 15, wherein each set of two magnetic surfaces is capable of receiving between 10 and 90 turns of the magnetic link.

* * * * *